(12) United States Patent
Tetradis-Mairis et al.

(10) Patent No.: US 12,225,909 B2
(45) Date of Patent: Feb. 18, 2025

(54) APPARATUS AND METHOD FOR MANUFACTURING BAKED WAFFLE CONE SHEETS

(71) Applicant: Conopco, Inc., Englewood Cliffs, NJ (US)

(72) Inventors: Georgios Tetradis-Mairis, Bedford (GB); Francesco Cusani, Rome (IT); Yainy Patricia Romero Cuevas, Northampton (GB)

(73) Assignee: Conopco, Inc., Englewood Cliffs, NJ (US)

( * ) Notice: Subject to any disclaimer, the term of this patent is extended or adjusted under 35 U.S.C. 154(b) by 308 days.

(21) Appl. No.: 17/286,258

(22) PCT Filed: Oct. 17, 2019

(86) PCT No.: PCT/EP2019/078271
§ 371 (c)(1),
(2) Date: Apr. 16, 2021

(87) PCT Pub. No.: WO2020/079183
PCT Pub. Date: Apr. 23, 2020

(65) Prior Publication Data
US 2021/0337811 A1    Nov. 4, 2021

(30) Foreign Application Priority Data
Oct. 19, 2018   (EP) .................................... 18201619

(51) Int. Cl.
*A21B 5/02*    (2006.01)
*A21C 15/02*   (2006.01)
*A21D 13/33*   (2017.01)

(52) U.S. Cl.
CPC ............ *A21B 5/026* (2013.01); *A21C 15/025* (2013.01); *A21D 13/33* (2017.01)

(58) Field of Classification Search
CPC ....... A21B 5/026; A21B 5/023; A21C 15/025; A21D 13/33
See application file for complete search history.

(56) References Cited

U.S. PATENT DOCUMENTS

| 264,867 A | 9/1882 | Ege |
| 1,413,369 A | 4/1922 | Winder |

(Continued)

FOREIGN PATENT DOCUMENTS

| CN | 101461670 | 6/2009 |
| CN | 102894051 | 1/2013 |

(Continued)

OTHER PUBLICATIONS

Search Report and Written Opinion in EP18201619.
Search Report and Written opinion in PCTEP2019078271; Nov. 20, 2019.

*Primary Examiner* — Joe E Mills, Jr.
(74) *Attorney, Agent, or Firm* — Gerard J. McGowan, Jr.

(57) ABSTRACT

An apparatus for automatically preparing baked waffle cone sheets, for use in preparing a waffle cone to be filled with a frozen confectionery product, from waffle cone batter, the apparatus comprising a baking station, the baking station comprising a plurality of baking plate locations onto which the waffle cone batter is to be deposited, each baking plate location comprising an essentially planar baking surface comprising a characteristic waffle region comprising a first array of parallel linear grooves, so as to produce a characteristic waffle pattern in the baked waffle sheet from the resulting parallel linear protrusions in the baked waffle sheet; wherein each baking plate location also comprises a graphical region, the graphical region being located within the characteristic waffle region and comprising grooves corresponding to a graphical image, and also comprising at least one linear groove, each linear groove being contiguous (Continued)

with, dimensionally similar to and collinear with a groove in the characteristic waffle region, and wherein the spacing density of grooves in the graphical region is less than that in the surrounding characteristic waffle region.

6 Claims, 4 Drawing Sheets

(56) References Cited

U.S. PATENT DOCUMENTS

| | | |
|---|---|---|
| 2,069,026 A | 1/1937 | Balton |
| 4,761,293 A | 8/1988 | Herting |
| 5,142,967 A | 9/1992 | Herting |
| 5,284,672 A * | 2/1994 | Ito .................... A21C 15/025 |
| | | 426/138 |
| 5,996,476 A | 12/1999 | Schultz |
| 9,572,350 B2 | 2/2017 | Reinhart et al. |
| 2001/0046535 A1 | 11/2001 | Bowling |
| 2005/0098926 A1 * | 5/2005 | Tamura .............. B29C 35/0277 |
| | | 99/324 |
| 2009/0025570 A1 * | 1/2009 | Larson ................ A47J 37/0611 |
| | | 99/376 |
| 2009/0200291 A1 * | 8/2009 | Haas ....................... H05B 6/12 |
| | | 219/622 |
| 2014/0050820 A1 | 2/2014 | DeVaul |
| 2016/0007799 A1 | 1/2016 | Steeb |
| 2019/0075803 A1 | 3/2019 | Oexmann et al. |

FOREIGN PATENT DOCUMENTS

| | | |
|---|---|---|
| CN | 104023541 | 9/2014 |
| DE | 4111011 | 6/1992 |
| DE | 4208382 | 9/1993 |
| DE | 202017006704 | 8/2018 |
| GB | 711900 | 7/1954 |
| GB | 1550232 | 8/1979 |
| JP | 201430365 | 2/2014 |
| WO | WO08025639 | 3/2008 |
| WO | WO13024152 | 2/2013 |

* cited by examiner

APPARATUS AND METHOD FOR MANUFACTURING BAKED WAFFLE CONE SHEETS

FIELD OF THE INVENTION

The present invention relates to an apparatus and method for automatically manufacturing baked waffle sheets, suitable for subsequent forming into a cone shape and filling with a frozen confectionery material. The invention also relates to the baked waffle sheets and cones produced by the present invention.

BACKGROUND OF THE INVENTION

Baked waffle sheets are well-known as a popular edible component of frozen confectionery products, especially ice cream. A popular version is when the sheet is formed into a cone.

Such waffle sheets can be made individually from baked waffle sheets on a baking plate in a similar way as a waffle is made from a waffle batter. However, in order to produce such waffle sheets in a large quantity efficiently, they are produced in an automated manner in a factory.

Such an automated process typically involves a baking station, comprising a number of discrete baking plates, or a continuous web of baking plates, providing a number of baking plate locations. The baking plates are essentially planar but include an array of parallel grooves to provide the characteristic waffle pattern in the final baked sheet. Typically the grooves include a second array of perpendicular grooves, so as to provide a characteristic waffle hatching pattern.

Baking typically occurs by bringing a heated plate down onto the baking plate to compress the waffle batter between the hot plates. The upper plate is typically smooth and flat without any grooves, as this aids removal of the baked waffle sheet following baking. It is believed that this is primarily due to the fact that more surface area of the baked waffle is in contact with the lower baking plate than with the upper baking plate.

Once baking has occurred, the upper baking plate lifts off and the baked sheets of waffle are lifted from the baking plates by passing a scraper comprising teeth along the surface of the baking plate. The teeth are shaped to fit within the grooves so as to lift the baked sheet conveniently onto the ramp. Once they are removed from the baking surface they can then travel onto subsequent stations, e.g. a cone-forming station and a filling station. This produces a baked waffle sheet with a smooth side and a side comprising an array of parallel linear protrusions, providing the characteristic waffle cone pattern.

Typically the protrusions on the surface of the baked waffle sheet, formed as a result of the grooves in the baking surface, are presented on the exterior of the resulting cone, and usually the interior of the cone is smooth, resulting from the application of a smooth heated plate. The smooth interior surface assists with the filling of a frozen confectionery product, such as ice cream.

It would, however, be desirable to be able to introduce graphical representations, formed from raised baked waffle, onto the baked waffle sheet, so that they are visible to a consumer on the exterior of the cone once it is formed. US 2014/050820 discloses a waffle for use as a divider in an ice cream product. The desire to have a graphical representation on a side of the waffle comprising the characteristic waffle pattern is expressed, however no technical details are provided as to how this could be practically achieved.

DE 202017006704 U1 discloses an example of a continuous waffle baking device. It notes that, due to the functional requirement of the grooves in the lower baking plate and the technical requirement of the ramp and its teeth passing along the grooves, there is no possibility of introducing a graphical element on the side of the waffle comprising the protruding characteristic waffle cone appearance. Instead they propose introducing a graphical element to the smooth side of the waffle, and arranging the waffle into a cone with the smooth side facing outwards and the characteristic waffle pattern facing inwards.

It is an object of the present invention to provide improvements in this area.

SUMMARY OF THE INVENTION

The present inventors have noted that it is desirable to retain the feature of the characteristic waffle pattern on the exterior of the waffle cone, with a smooth surface on the interior, whilst providing a graphical representation on the exterior of the waffle cone.

Through developments made by the inventors, it has been surprisingly found that graphical representations can be produced in the baked waffle sheet by the waffle batter that have sufficient visual clarity and on the same side of the waffle sheet as the characteristic waffle pattern. This is also possible without slowing down the manufacturing process or making it less reliable.

As discussed above, the teeth of the scraper are very important in ensuring an effective release of the baked waffle sheet from the baking plate. In view of the fact that the teeth travel along grooves in the baking plate, it is self-evident that the grooves they pass along must be continuous, in order to allow the teeth to travel along the surface of the baking plate unhindered. Additionally, these grooves produce linear protrusions in the resulting waffle sheet which interfere with the presentation of a graphical image. Simply adding further grooves in the baking plate to make a graphical representation superimposed onto the waffle pattern proves to be undesirable due to the presence of the characteristic waffle pattern interfering with the appearance of the image.

It has however been surprisingly found that the spacing of the teeth can be increased in the region that passes through the graphical region, whilst retaining a conventional spacing in the remainder of the waffle sheet, thereby retaining the characteristic waffle cone appearance on the exterior of the resulting cone. This has the effect that the graphical representation, whilst still containing some raised linear protrusions, contains fewer of them within it than the remainder of the waffle sheet, enabling the graphical image to be less disturbed by their presence.

Thus, in a first aspect, the present invention relates to an apparatus for automatically preparing baked waffle sheets, for use in preparing a waffle cone to be filled with a frozen confectionery product, from waffle cone batter, the apparatus comprising a baking station, the baking station comprising a plurality of baking plate locations onto which the waffle cone batter is to be deposited, each baking plate location comprising an essentially planar baking surface comprising a characteristic waffle region comprising a first array of parallel linear grooves, so as to produce a characteristic waffle pattern in the baked waffle sheet from the resulting parallel linear protrusions in the baked waffle sheet;

wherein each baking plate location also comprises a graphical region, the graphical region being located within the characteristic waffle region and comprising grooves corresponding to a graphical image, and also comprising at least one linear groove, each linear groove being contiguous with, dimensionally similar to and collinear with a groove in the characteristic waffle region, and wherein the spacing density of grooves in the graphical region is less than that in the surrounding characteristic waffle region.

Thus, the invention provides an apparatus that can produce waffle cones that appear conventional with the characteristic waffle pattern on the exterior, but also wherein there is a region that includes a graphical representation on the exterior.

Typically the characteristic waffle pattern will comprise a first array of parallel linear raised protrusions that are equally spaced apart. Usually there will also be a second array of parallel linear raised protrusions that are equally spaced apart running at an angle, e.g. perpendicular to, the first array. This provides an attractive and well-known hatching pattern on the resulting waffle cone.

The baking plate therefore has a first array of parallel linear grooves that are equally spaced apart. Usually there will also be a second array of parallel linear grooves that are equally spaced apart running at an angle, e.g. perpendicular to, the first array.

For the purposes of the present invention, the teeth of the scraper are arranged to travel along a respective linear groove in the first array of parallel linear grooves. It will be immediately apparent that no teeth need to pass along the grooves of the second array. As a result there is complete freedom to introduce discontinuities in the grooves of the second array, whereas the linear grooves of the first array, along which teeth travel, must remain continuous.

As such, if present, there are preferably no linear grooves in the graphical region where the grooves of the second array would pass through the graphical region.

As discussed above, linear grooves present in the graphical region are contiguous with, dimensionally similar to and collinear with a groove in the characteristic waffle region, this typically being a groove in the first array.

As the linear grooves in the first array are preferably equally spaced apart, the grooves present in the graphical region are preferably also equally spaced. In one convenient embodiment the spacing of the grooves in the graphical region is twice that of the spacing in the characterizing waffle region. This can be conveniently achieved by omitting alternate linear grooves that pass through the graphical region.

In a similar manner the spacing between the grooves in the graphical region can be three times that in the characterizing waffle region. This can be conveniently achieved by omitting pairs of adjacent grooves that pass through the graphical region.

Accordingly, the graphical region can completely omit any grooves present in the second array and only contain a reduced amount of grooves from the first array, sufficient to ensure reliable removal of the baked waffle sheet by the teeth of the scraper. This provides an effective compromise between the technical requirements of the presence of sufficient grooves with the desire to be able to present a graphical image without too much disturbance from linear grooves passing therethrough.

Accordingly, in a preferred embodiment, the baking station is followed by a release station, which comprises a scraper comprising a ramp comprising a number of teeth, the teeth dimensioned to travel within the grooves of the baking plate, the ramp and teeth being aligned at an acute angle to the surface of the baking plate, arranged such that the baked waffle sheet rises away from the baking plate onto the ramp as the scraper passes along the baking plate, wherein the teeth of the scraper are arranged to travel only through grooves of the first array that only travel continuously through the baking plate surface.

In this way, there are sufficient teeth to provide effective removal of the baked waffle cone, as some teeth do pass through the graphical region. Thus the graphical region can be reasonably large, as the teeth are permitted to pass through it, without the baked waffle sheet becoming difficult to remove from the baking plate.

Thus, the scraper will preferably comprise teeth that are spaced apart by a distance of n, 2n and/or 3n, wherein n is the spacing between the linear grooves in the characteristic waffle region. In general the teeth will be spaced apart by n for the grooves that do not pass through the graphical region and by 2n or 3n for the grooves that pass through the graphical region. If the spacing increases too far, even 4n or at least 5n or greater, then the removal of the baked waffle sheet can become unreliable, and so this is not generally preferred.

It is believed that the distance between teeth should not be greater than 30 mm for reliable removal of the baked waffle sheet. However, as will be understood, the present invention permits the presence of a graphical image greater than the maximum spacing between the teeth.

However, although there may be increased spacing between the teeth passing through the graphical region, it is preferable that some form of truncated tooth is positioned between the teeth that are more spaced apart. Such truncated teeth would not travel along the grooves of the baking plate, but do act to provide a guide to assist in the removal of the baked waffle sheet to travel up the scraper and onto the ramp more effectively and reliably. In one preferred embodiment, truncated teeth are positioned so that they are spaced a distance of n from a tooth of the scraper. For example, when the spacing between the teeth is 2n, there is preferably a truncated tooth positioned midway between them.

In a preferred arrangement, a source of cool air is provided to the surface of the baked waffle sheet prior to it arriving at the scraper. It has been found that even a short amount of exposure to cool air can help to stiffen the upper surface of the baked waffle and provide some rigidity, increasing the reliability of the baked waffle sheet leaving the baking surface and travelling up onto the ramp.

The apparatus of the present invention is automated and may operate in a continuous or batch manner.

The graphical region can comprise a graphic capable of being represented by raised portions of the baked waffle sheet. In particular this could be words, logos or pictures.

In use, waffle cone batter is placed onto the baking plates and baked to form a baked waffle sheet by using the apparatus of the present invention.

Thus, in a second aspect, the invention relates to a method of continuously manufacturing baked waffle sheets, for use in preparing a waffle cone to be filled with a frozen confectionery product, from waffle cone batter, the method comprising employing an apparatus as described herein, the method comprising sequentially depositing a portion of waffle cone batter onto the plurality of baking plate locations so as to cover the graphical region and a portion of the surrounding characteristic waffle region, carrying out a baking operation so as to produce the baked waffle sheets, wherein the sheets comprise a characteristic waffle pattern surrounding a graphic image.

In a third aspect, the invention relates to a baked waffle sheet, for use as a component of a frozen confectionery product, the sheet having an exterior surface that comprises a first array of parallel linear protrusions of baked waffle material to form a characteristic waffle pattern, and comprising a graphical region, the graphical region being located within the characteristic waffle pattern and comprising raised portions of baked waffle material forming a graphic representation, the graphical region comprising parallel linear protrusions of baked waffle material being contiguous with, dimensionally similar to and collinear with raised protrusions in the characteristic waffle pattern, but at a spacing density which is less than that in the characteristic waffle pattern.

Preferably the baked waffle sheet is formed into the shape of a cone, for use as a component of a frozen confectionery product, the waffle cone having an interior surface that is essentially smooth.

The invention will now be illustrated by way of example and with reference to the following figures in which.

Figure 1:
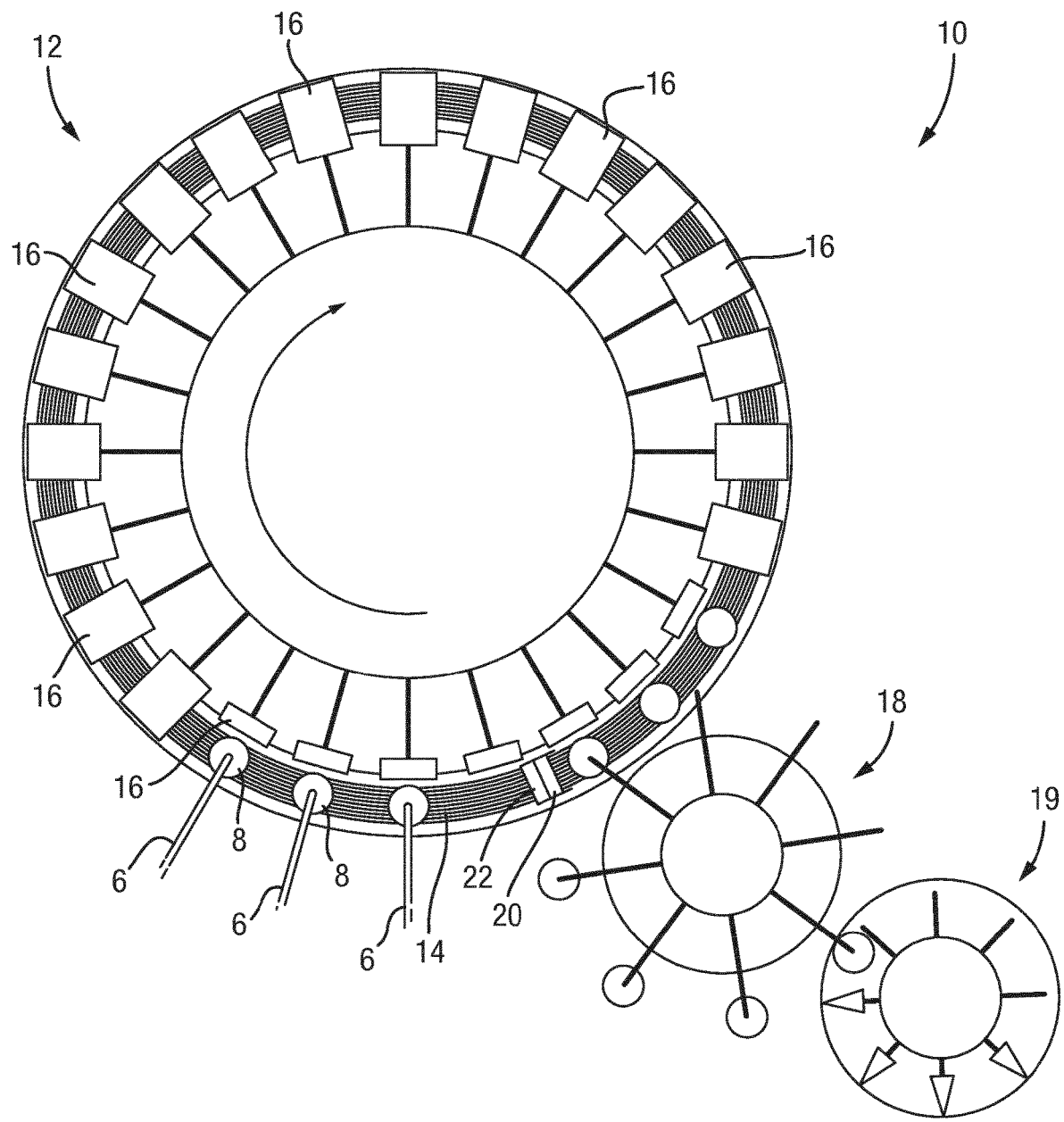
FIG. 1 is a schematic representation of a waffle cone apparatus according to the present invention.

Turning to the figures, FIG. 1 shows an apparatus 10 for automatically preparing baked waffle cone sheets according to the invention, comprising a baking station 12 comprising a web of continuously travelling baking plates 14 with corresponding upper baking plates 16 which rotates in a clockwise direction, shown by the arrow. Also shown is a release station 18 comprising a scraper 20 and a ramp 22.

Waffle batter 8 is deposited onto the baking plates 14 by tubes 6. As the waffle batter is carried around by the baking stations rotation the upper baking plates 16 move downwards to begin the baking step. Shortly before the waffle arrives at the release station 18 the upper baking plates rise upwards, so that the baked waffle sheets can rise onto the ramp 22 and be carried by the release station 18 to a cone former station 19.

Figure 2:
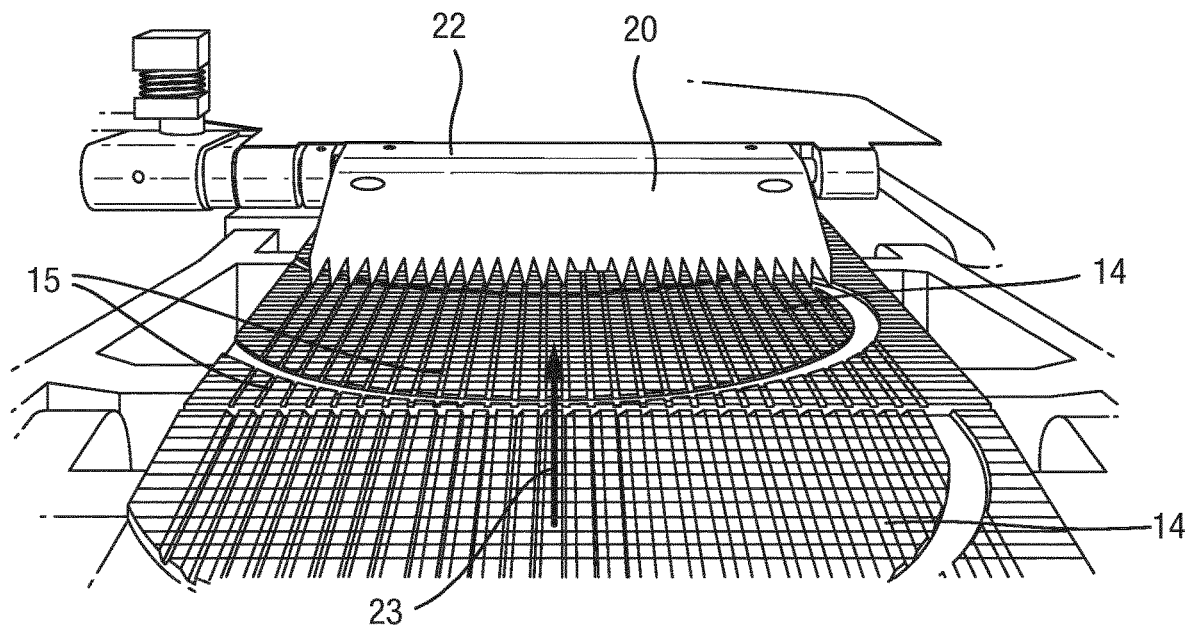
FIG. 2 is a close-up view of the baking plates of the apparatus of FIG. 1.

As shown in FIG. 2 the baking plates 14 travel towards the scraper 20 in the direction of arrow 23. The baking plates 14 have a planar surface with a first array of parallel grooves 15, which are also parallel with the direction of travel of the baking plates. The baking plates also comprise a second array of parallel grooves (not visible in FIG. 2), being perpendicular to the first array 15. The upper baking plates 16 have a smooth surface (not shown).

Figure 3:
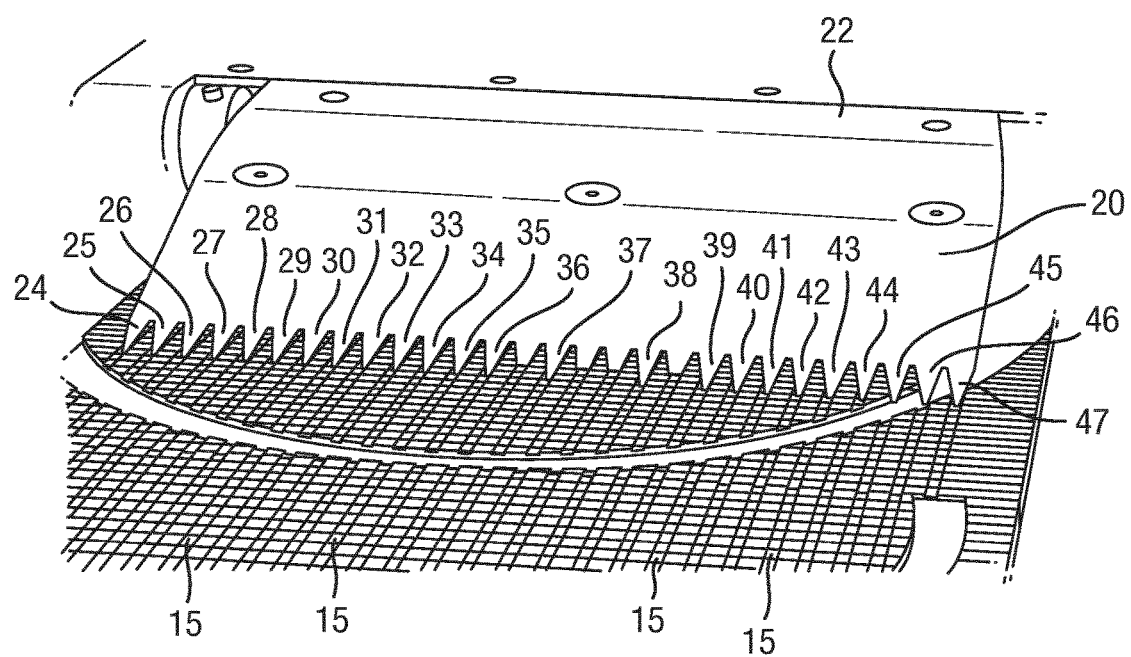
FIG. 3 is a close-up view of the scraper and baking plate shown in FIG. 2.

FIG. 3 shows in greater detail the scraper 20, which comprises a number of teeth 24 to 47. It can be seen that teeth 24 to 34 travel along a respective groove in the first array 15.

It can also be seen that the spacing between most of the teeth is n, where n is the distance between the grooves of the first array. It can also be seen that the spacing between adjacent teeth 36 and 37 and between 38 and 39 is 2n. It can also be seen that the spacing between adjacent teeth 37 and 38 is 3n. It can also be seen that truncated teeth are positioned between teeth 36 and 37, between teeth 37 and 38 and between 38 and 39. These truncated teeth do not travel along grooves of the first array but do provide some assistance in lifting the baked waffle reliably onto the ramp.

Figure 4:
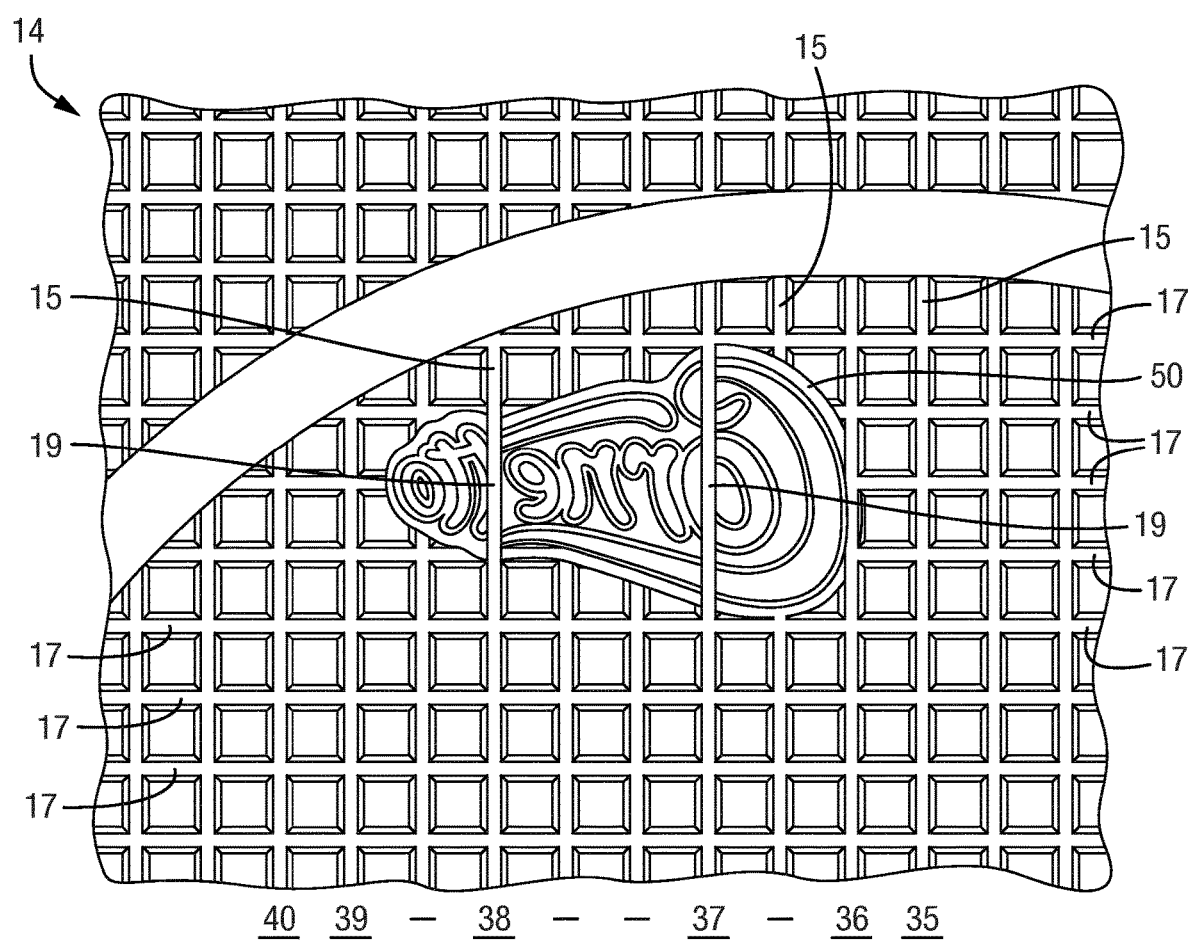
FIG. 4 is close-up view of the surface of the baking plate showing a graphical region within a characteristic waffle region.

FIG. 4 shows a close-up image of the surface of a baking plate 14 and shows a graphical region 50 surrounded by a characteristic waffle region provided by the first array of parallel grooves 15 and the second array of parallel grooves 17.

It can be seen that the graphical region 50 comprises a pattern of grooves to form a graphical image in the resulting waffle sheet. In this case the graphical image is the trade name Cometto™. The graphical region 50 also contains two linear parallel grooves 19 that are contiguous with, dimensionally similar to and collinear with grooves in the first array 15. The spacing between the grooves 19 is 3n.

As discussed above, the teeth 24 to 47 of the scraper 20 travel along the linear parallel grooves of the first array 15. Indicated on FIG. 4 are the reference numbers of the teeth shown in FIG. 3 that travel along each of the grooves 15 shown in FIG. 4. It will be noted that some of the grooves 15 do not have any teeth traveling along them. This is because these grooves are not continuous, as they terminate at the interface with the graphical region 50. These grooves are however present to maintain the characterizing waffle pattern surrounding the graphical region 50.

In use, waffle batter (not shown) is deposited onto the baking plate surface at the baking station 12. Then upper baking plates 16 move downwards onto the baking plate 14 and baking of the waffle batter begins. Once baking is complete the upper baking plate 16 is lifted off. In view of the smooth surface of the upper baking plate, the baked waffle sheet sticks to the lower baking plate 14.

The baking plates 12 then move to the release station 18, whereupon the teeth of the scraper 20 come into contact with the baked waffle sheet. The teeth of the scraper travel underneath the baked waffle sheet and begin lifting the baked waffle sheet onto the scraper and ramp away from the baking plate 14.

In view of the fact that the graphical region contains two grooves through which teeth 37, 38 pass, the baked waffle sheet lifts from the baking plate effectively and reliably, despite the relatively large size of the graphical region.

Figure 5:
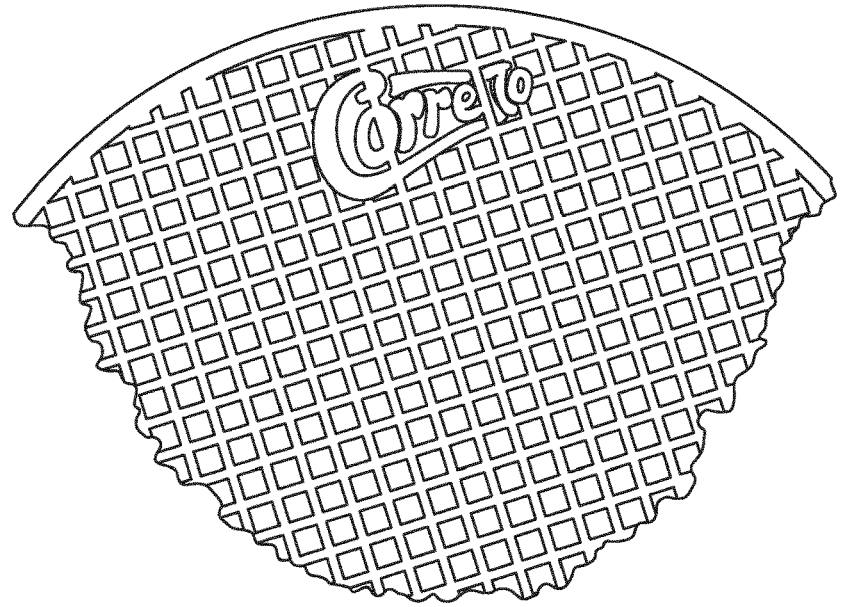
FIG. 5 is a view of a baked waffle sheet produced according to the apparatus shown in FIGS. 1 to 4.
Figure 6:
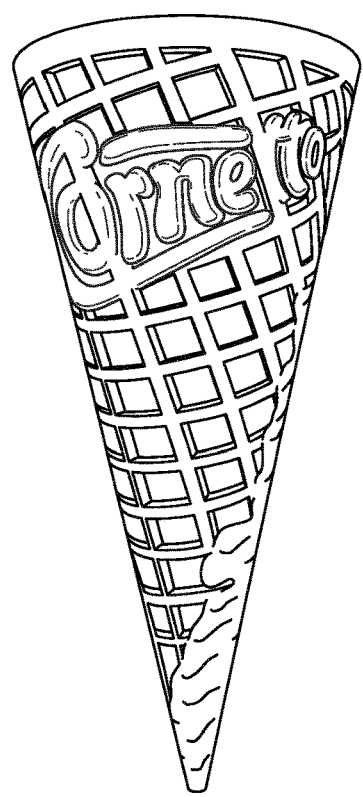
FIG. 6 is a waffle cone produced from the baked waffle sheet shown in FIG. 5.

The baked waffle sheet thus formed is shown in FIG. 5. The baked waffle sheet formed into a cone to be filled with a frozen confectionery product is also shown in FIG. 6. It can be seen that the graphical image is clearly shown, in view of the fact that only two grooves pass through the graphical region, providing little disturbance to the presented image.

The invention claimed is:

1. An apparatus for automatically and continuously preparing baked waffle cone sheets, for use in preparing a waffle cone to be filled with a frozen confectionery product, from waffle cone batter, the apparatus comprising a baking station, the baking station comprising a plurality of baking plate locations onto which the waffle cone batter is to be deposited, each baking plate location comprising an essentially planar baking surface comprising a characteristic waffle region comprising a first array of parallel linear grooves, so as to produce a characteristic waffle pattern in the baked waffle sheet from the resulting parallel linear protrusions in the baked waffle sheet;

wherein each baking plate location also comprises a graphical region, the graphical region being located within the characteristic waffle region and comprising grooves corresponding to a graphical image, and also comprising at least one linear groove, each linear groove being contiguous with, dimensionally similar to and collinear with a groove in the characteristic waffle region, and wherein the grooves have a spacing density in the graphical region which is less than that in the surrounding characteristic waffle region and wherein the baking station is followed by a release station, which comprising a scraper comprising a ramp comprising a number of teeth, the teeth dimensioned to travel within the grooves of the first array, the ramp and teeth being aligned at an acute angle to the surface of the baking plate, arranged such that the baked waffle cone sheet rises away from the baking plate onto the ramp as the scraper passes along the baking plate, wherein the teeth of the scraper are arranged to travel only through rooves of the first array that only travel continuously through the baking surface.

2. The apparatus according to claim 1, wherein the baking surface comprises a second array of parallel linear grooves that are equally spaced apart running at an angle to the first array.

3. The apparatus according to claim 1, wherein the linear grooves in the first array are equally spaced apart.

4. The apparatus according to claim 1, wherein the grooves present in the graphical region are equally spaced apart.

5. The apparatus according to claim 3, wherein the spacing of the grooves in the graphical region is twice that of the spacing in the first array.

6. The apparatus according to claim 3, wherein the scraper comprises teeth that are spaced apart by a distance of n, 2n and/or 3n, wherein n is the spacing between the linear grooves in the characteristic waffle region.

\* \* \* \* \*